US012789192B2

(12) United States Patent
Ling et al.

(10) Patent No.: US 12,789,192 B2
(45) Date of Patent: Nov. 10, 2026

(54) DETECTION DEVICES

(71) Applicant: ASSURE TECH. (HANGZHOU) CO., LTD., Hangzhou (CN)

(72) Inventors: Shisheng Ling, Hangzhou (CN); Jianfeng Wang, Hangzhou (CN)

(73) Assignee: ASSURE TECH. (HANGZHOU) CO., LTD., Hangzhou (CN)

( * ) Notice: Subject to any disclaimer, the term of this patent is extended or adjusted under 35 U.S.C. 154(b) by 540 days.

(21) Appl. No.: 18/477,539

(22) Filed: Sep. 28, 2023

(65) Prior Publication Data

US 2024/0109068 A1 Apr. 4, 2024

(30) Foreign Application Priority Data

Sep. 29, 2022 (CN) ......................... 202211198400.9

(51) Int. Cl.
*B01L 3/00* (2006.01)

(52) U.S. Cl.
CPC ......... *B01L 3/523* (2013.01); *B01L 2300/042* (2013.01); *B01L 2300/0825* (2013.01)

(58) Field of Classification Search
None
See application file for complete search history.

(56) References Cited

U.S. PATENT DOCUMENTS 9,535,054 B2 * 1/2017 Yuan .................... G01N 33/493
11,340,213 B2 5/2022 Fang et al.
2011/0107824 A1 * 5/2011 Lv ...................... A61B 10/0045 73/64.56
2013/0291659 A1 * 11/2013 Ling ...................... B01L 3/502 73/863.02
2021/0033598 A1 * 2/2021 Wu ........................ G01N 33/68

FOREIGN PATENT DOCUMENTS

CN 101598724 B 6/2013
CN 103424547 B 2/2015
CN 206020428 U 3/2017
CN 207248882 U 4/2018
CN 212023309 U 11/2020
CN 217052234 U 7/2022
CN 218974372 U 5/2023

OTHER PUBLICATIONS

The Second Office Action in Chinese Application No. 202211198400.9 mailed on Jan. 17, 2026, 16 pages.

* cited by examiner

*Primary Examiner* — Lore R Jarrett
(74) *Attorney, Agent, or Firm* — METIS IP LLC

(57) ABSTRACT

Some embodiments of the present disclosure provide a detection device. The detection device may include: a cup used to accommodate a substance, a sidewall of the cup including a curved portion and a flat portion. Two sides of the curved portion may be connected with two sides of the flat portion, respectively. The detection device may further include a test component disposed with a plurality of test strips; the test component being disposed within the cup. The detection device may further include a mounting structure. The test component may be disposed on the flat portion through the mounting structure.

18 Claims, 5 Drawing Sheets

DETECTION DEVICES

CROSS-REFERENCE TO RELATED APPLICATIONS

This application claims priority to Chinese Patent Application No. 202211198400.9, filed on Sep. 29, 2022, the content of which is hereby incorporated by reference.

TECHNICAL FIELD

The present disclosure relates to the field of liquid detection devices, and in particular to a detection device capable of performing detection of a plurality of types of samples.

BACKGROUND

Medicine or drug abuse has become an increasingly serious social problem, and a urine cup, as a common detection device, may be used to urine detection, thereby determining the type of medicine or drug used by a subject. However, a test component of an existing detection device may have a small area, which is able to detect fewer types of medicines or drugs, and a structure of the detection device is not convenient for the user to observe a detection result, thus causing many inconveniences to the user.

For the above reasons, the present disclosure aims to provide a detection device including a test component having a greater detection area, being used for detection of more types of compositions, and the structure of the detection device may be more convenient for the user to observe the detection result.

SUMMARY

Some embodiments of the present disclosure may provide a detection device including: a cup used to accommodate a substance, a sidewall of the cup including a curved portion and a flat portion, two sides of the curved portion being connected with two sides of the flat portion, respectively; a test component disposed with a plurality of test strips, the test component being disposed within the cup; and a mounting structure, the test component being disposed on the flat portion through the mounting structure.

In some embodiments, the mounting structure may include one or more first limiting components provided on the bottom wall of the cup, a bottom end of the test component being mounted between the first limiting components and the flat portion.

In some embodiments, the mounting structure may include one or more clamping slots disposed on an inner sidewall of the cup, the one or more clamping slots being located at a top region of the flat portion, and a top end of the test component being clamped into the one or more clamping slots.

In some embodiments, the test component may be rectangular, a number of the one or more clamping slots may be two, and two top corners of the top end of the test component clamping into each of the two clamping slots.

In some embodiments, the mounting structure may further include a mounting platform, a bending portion and a clamping assembly, the mounting platform being disposed on the inner sidewall of the cup, the bending portion being disposed on the test component. The mounting platform may be disposed on a side of the flat portion near the top region of the cup, an angle between the mounting platform and the flat portion being greater than 0°. The bending portion may be fixed to the mounting platform through the clamping assembly.

In some embodiments, the clamping assembly may include a mounting recess disposed on one of the bending portion and the mounting platform, and a mounting projection disposed on the other one of the bending portion and the mounting platform. The mounting projection may be able to clamp into the mounting recess.

In some embodiments, the clamping assembly may include a second limiting component disposed on the mounting platform. The second limiting component may be able to clamp and cooperate with a portion of an outer edge of the bending portion after bending.

In some embodiments, a slot may be disposed on each of both sides of the outer edge in a lengthwise direction of the bending portion. The second limiting component may include two limiting projections disposed at both ends of the mounting platform in the lengthwise direction, one of the two limiting projections being able to be embedded into slot disposed on each of both sides of the outer edge.

In some embodiments, the cup may be disposed with an opening at a top region of the cup. An angle between a plane where the opening is located and the bottom wall of the cup may be greater than 0° and less than 90°.

In some embodiments, an angle between an inner side of the flat portion and an inner side of a bottom wall of the cup is greater than 90° may be provided.

BRIEF DESCRIPTION OF THE DRAWINGS

The present disclosure will be further illustrated by way of exemplary embodiments, which will be described in detail by means of the accompanying drawings. These embodiments are not limiting, and in these embodiments the same numbering denotes the same structure, wherein.

DETAILED DESCRIPTION

Figure 1:
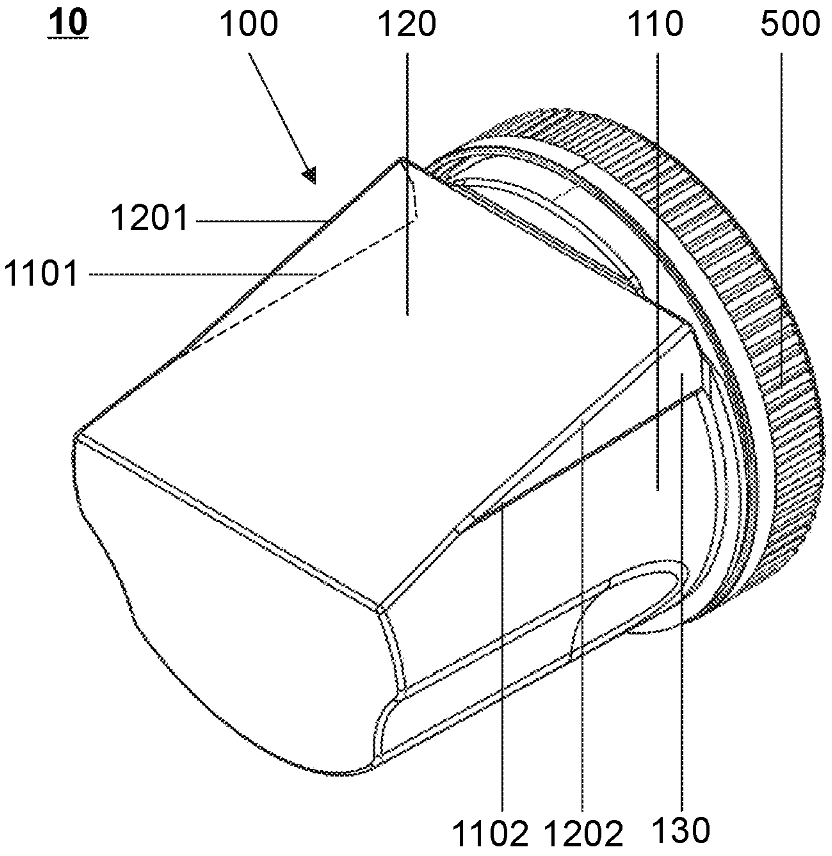
FIG. 1 is a schematic diagram illustrating an exemplary detection device according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and it is possible for those skilled in the art to apply the present disclosure to other similar scenarios in accordance with these accompanying drawings without creative labor. Unless obviously obtained from the context or the context illustrates otherwise, the same numeral in the drawings refers to the same structure or operation.

As indicated in the present disclosure and in the claims, unless the context clearly suggests an exception, the words “one,” “a,” “a kind of,” and/or “the” are not intended to be specifically refer to the singular form, but may also include the plural form. In general, the terms “comprise,” “comprises,” and/or “comprising,” “include,” “includes,” and/or “including,” merely prompt to include steps and elements that have been clearly identified, and these operations and elements do not constitute an exclusive listing. The methods or devices may also include other operations or elements. The term “based on” is “based at least in part on.” The term “some embodiments” means “at least one embodiment”; the term “other embodiments” means “at least one additional embodiment.”, and related definitions of other terms will be given in the following descriptions.

The present disclosure may provide a detection device used to detect a composition of a liquid (e.g., a liquid such as urine, saliva, etc.). In some embodiments, a test strip in the detection device may be used for detection of the liquid accommodated in the detection device to determine the composition of the liquid.

In some embodiments, the detection device may include a cup, a test component, and a mounting structure. The cup may be used to accommodate a subject to be detected. The test component may be provided with a plurality of test strips, and the test component may be disposed within the cup. A sidewall of the cup may include a curved portion and a flat portion. The curved portion may be connected with the flat portion on two sides of the cup on a circumference direction of the sidewall of the cup, respectively. The test component may be provided on the flat portion by the mounting structure. In some embodiments, a detection range of the detection device may be effectively improved by disposing the plurality of test strips on the test component.

FIG. 1 is a schematic diagram illustrating an exemplary detection device according to some embodiments of the present disclosure. As shown in FIG. 1, a detection device 10 may include a cup 100 and a cup cover 500 disposed at an opening at a top region of the cup 100. The cup 100 may be used to collect a liquid to be detected, and the liquid to be detected may be detected by a test strip (e.g., the test strip 400 of FIG. 5) disposed on a test component (e.g., the test component 200 of FIG. 5). The cup cover 500 may be used to seal the cup 100. In the present disclosure, taking the opening of the cup 100 as a reference object, an end of the cup 100 away from the opening is a bottom end of the cup 100, and an end of the cup 100 near the opening is a top end of the cup 100.

In some embodiments, the cup 100 may include a sidewall and a bottom wall connected with the sidewall. The sidewall of the cup 100 may include a flat portion 120 and a curved portion 110. The flat portion 120 refers to a portion of the sidewall with a flat outer surface. The curved portion 110 refers to a portion of the sidewall with a curved outer surface. Two sides of the curved portion 110 (including one side 1101 and the other side 1102) along a circumference direction of the sidewall of the cup may be connected with two sides of the flat portion 120 (including one side 1201 and the other side 1202) perpendicular to or substantially perpendicular to the circumference direction of the sidewall of the cup. The circumference direction of the sidewall of the cup 100 refers to a direction of a perimeter of the sidewall of the cup 100. In other words, the two sides of the curved portion 110 and the two sides of the flat portion 120 extend along the axial direction of the cup 100 and are parallel or substantially parallel to the axial direction of the cup 100.

Figure 2:
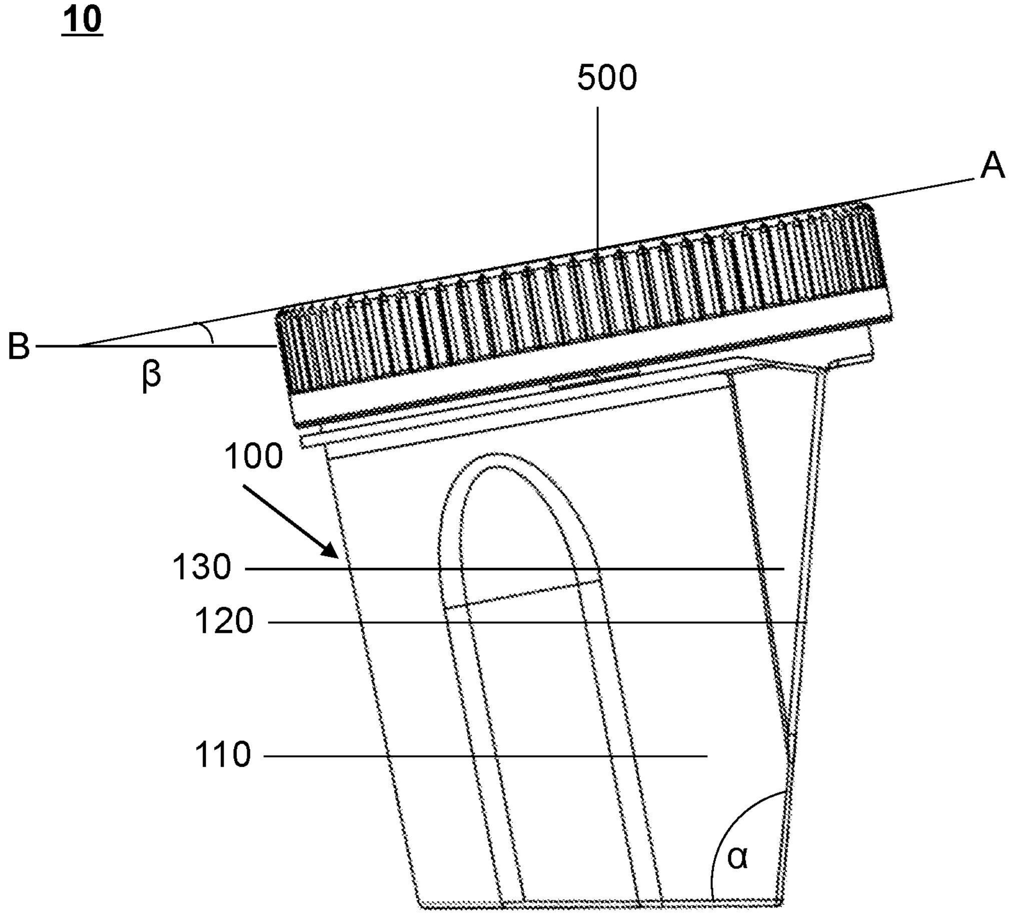
FIG. 2 is a schematic diagram illustrating the detection device in FIG. 1 from another view according to some embodiments of the present disclosure.

In some embodiments, the sidewall of the cup may include a transition portion. A first portion of a side 1201 of the two sides of the flat portion 120 may be directly connected with a first portion of a side 1101 of the two sides of the curved portion 110, and a second portion of the side 1202 of the two sides of the flat portion 120 may be connected with a second portion of the side 1102 of the two sides of the curved portion 110 through the transition portion. In some embodiments, the sidewall of the cup may include another transition portion. A first portion of another side 1201 of the two sides of the flat portion 120 may be directly connected with a first portion of another side 1101 of the two sides of the curved portion 110, and a second portion of the other side 1202 of the two sides of the flat portion 120 may be connected with a second portion of the other side 1102 of the two sides of the curved portion 110 through the other transition portion. For example, as shown in FIGS. 1 and 2, the sidewall of the cup 100 may further include a transition portion 130. Bottoms of the flat portion 120 and the curved portion 110 may both be connected with the bottom wall of the cup 100. A portion of the flat portion 120 and the curved portion 110 may be directly connected on the circumference direction of the sidewall of the cup, and a portion of the flat portion 120 and the curved portion 110 may be connected through the transition portion 130. In some embodiments, the transition portion 130 may be a portion of the sidewall that has a curved outer surface.

In some embodiments, merely as an example, as shown in FIG. 2, a first angle a greater than 90° may be formed between the flat portion 120 and the bottom wall of the cup 100, so as to facilitate an observation of the test component mounted on the flat portion 120 by a user for obtaining a detection result. The bottom wall of the cup 100 may be located at the bottom end of the cup 100. When the first angle $\alpha$ is greater than 90°, the cup 100 may be similar to a “horn-shaped” structure, making it more convenient for the user to observe the detect result of the test strip. In addition, when the flat portion 120 is inclined at a certain angle relative to the bottom wall of the cup 100, an area of the flat portion 120 may be made greater, so that more test strips may be disposed. At the same time, a plurality of test strips may be disposed on the same flat portion 120, in which case the observation of the plurality of test strips may be performed without rotating the cup 100, and the observation of the plurality of test strips may be more easily performed.

In some embodiments, the shape of the flat portion 120 may include a triangle, a rectangle, a rectangle-like shape (e.g., a rectangle with rounded top corners), an oval, a circle, a polygon, etc. By way of example only, as shown in FIG. 1, the shape of the flat portion 120 may be rectangular, and two opposing sides of the rectangular flat portion may be connected with the curved portion 110. The opposing sides may be not adjacent and parallel or substantially parallel to each other. In some embodiments, when the shape of the flat portion 120 is triangular, two sides of the flat portion 120 may be connected with the curved portion 110. When the shape of the flat portion 120 is circular, two portions of the sidewall on a diameter direction of the circular flat portion may be connected with the curved portion 110.

Figure 4:
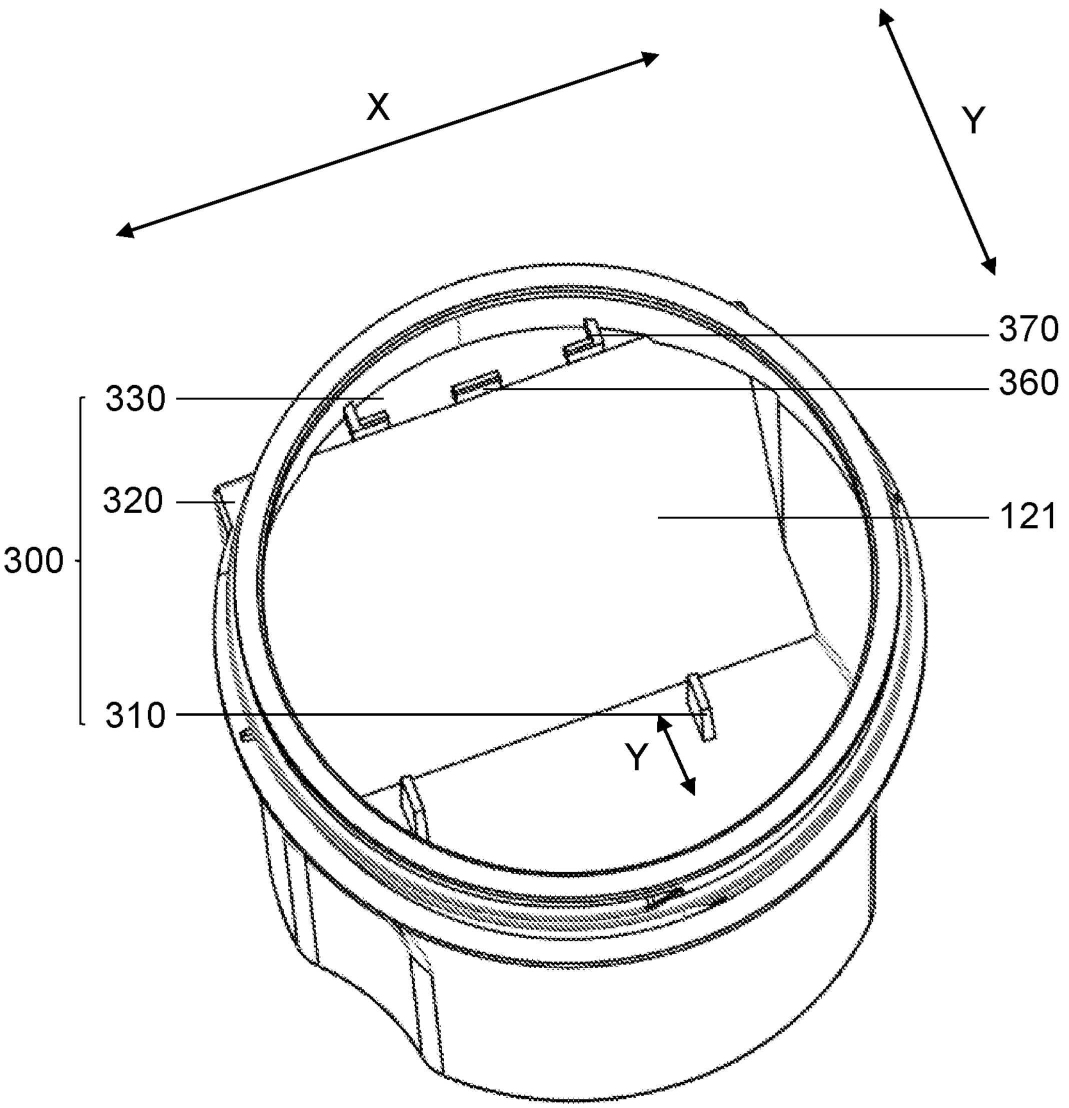
FIG. 4 is a schematic diagram illustrating an exemplary cup without the test component according to some embodiments of the present disclosure.

In some embodiments, the flat portion 120 may include a mounting plane (e.g., the mounting plane 121 in FIG. 4). The mounting plane 121 may incline with respect to the bottom wall of the cup 100 for mounting the test component. The mounting plane 121 being inclined with respect to the bottom wall of the cup 100 means that an angle between the mounting plane 121 and a plane on which the bottom wall of the cup 100 is located is greater than 90 degrees and less than 180 degrees. In some embodiments, the mounting plane 121 may be a surface of the flat portion 120 facing the inside of the cup 100. In some embodiments, the mounting plane 121 may be provided with a limiting structure for fixing the test component. More details about the mounting plane 121 may be found elsewhere in the present disclosure. See, for example, FIG. 4 and the descriptions thereof.

In some embodiments, the cup 100 may be provided with one or more graduated lines on the sidewall of the cup 100 for indicating a height of a liquid level within the cup 100. In some embodiments, the cup 100 may be made of a material with a certain transparency (i.e., a light-transmitting material) to allow the observation of the test component from outside the cup 100. For example, the cup 100 may be made of plexiglass.

In some embodiments, the cup cover 500 and the opening at the top region of the cup 100 may be sealingly connected. An exemplary sealing mode may include a thread sealing, a magnetic sealing, a snap assembly sealing, etc. Taking the thread sealing as example, an outer wall of the opening may be provided with external threads, and an inner wall of the cup cover 500 may be provided with internal threads adapted to the external threads.

In some embodiments, merely as an example, as shown in FIG. 2, a second angle β between a plane where the opening is located and a plane where the bottom wall of the cup 100 is located may be greater than 0° and less than 90°. When the cup 100 is provided with the cup cover 500, the plane where the opening of the cup 100 is located may be parallel to an upper surface of the cup cover 500, and the upper surface of the cup cover 500 may be represented by a plane A. The bottom wall of the cup 100 may be parallel to a horizontal plane B. The angle between the plane A and the horizontal plane B may be the second angle β. Accordingly, when the cup 100 is placed on a placement plane (e.g., the horizontal plane B), the plane where the opening of the cup 100 is located may be inclined at an angle (i.e., the second angle β) relative to the placing plane, so that a user is able to observe an interior of the cup 100 and conveniently observe the detection result. In addition, the plane where the opening of the cup 100 is located inclining at an angle relative to the placement plane may assist in demolding during an injection molding process.

Figure 5:
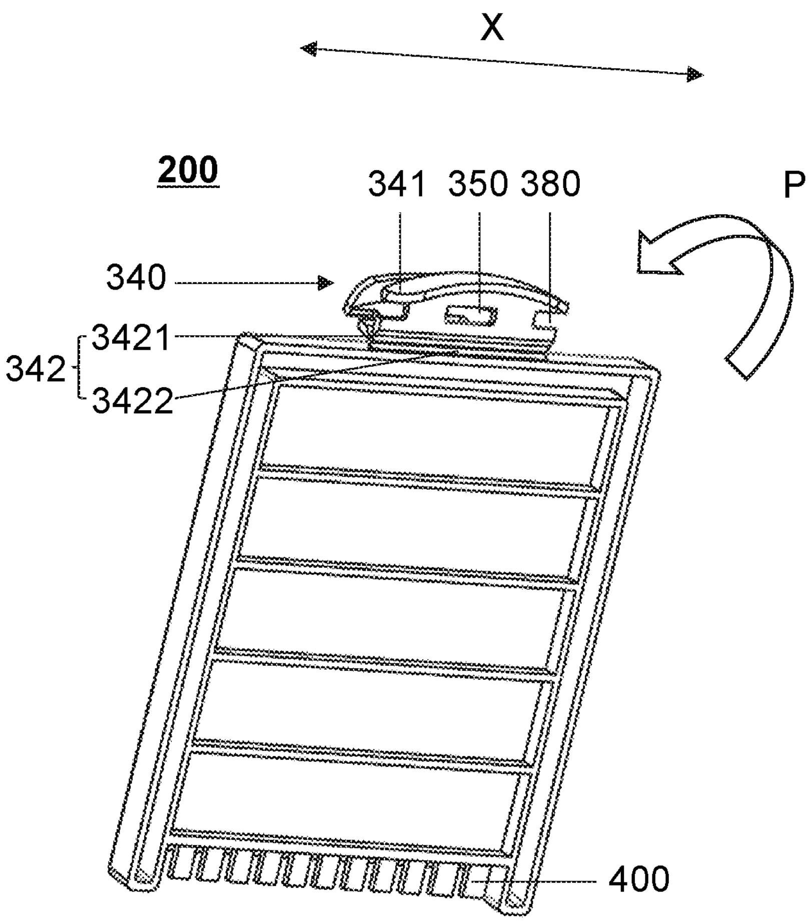
FIG. 5 is a schematic diagram illustrating an exemplary test component according to some embodiments according to the present disclosure.

In some embodiments, a test component (e.g., the test component in FIG. 5) may be used to set the one or more test strips (e.g., the test strip 400 in FIG. 5). In some embodiments, a plurality of test strips may be in a form of strips. The plurality of test strips may be spaced apart along a lengthwise direction of the test component. The lengthwise direction of the test component may be indicated by the "X" in FIGS. 3-5.

In some embodiments, the plurality of test strips may be the same type for detecting the same type of composition. In some embodiments, the plurality of test strips may be different types for detecting different types of compositions in the liquid, allowing for a wider range of detection.

More details about the test component may be found elsewhere in the present disclosure. See, for example, FIGS. 3, 5, and the descriptions thereof.

In some embodiments, the detection device 10 may include a mounting structure 300. The mounting structure 300 may be used to fix the test component to the flat portion 120.

Figure 3:
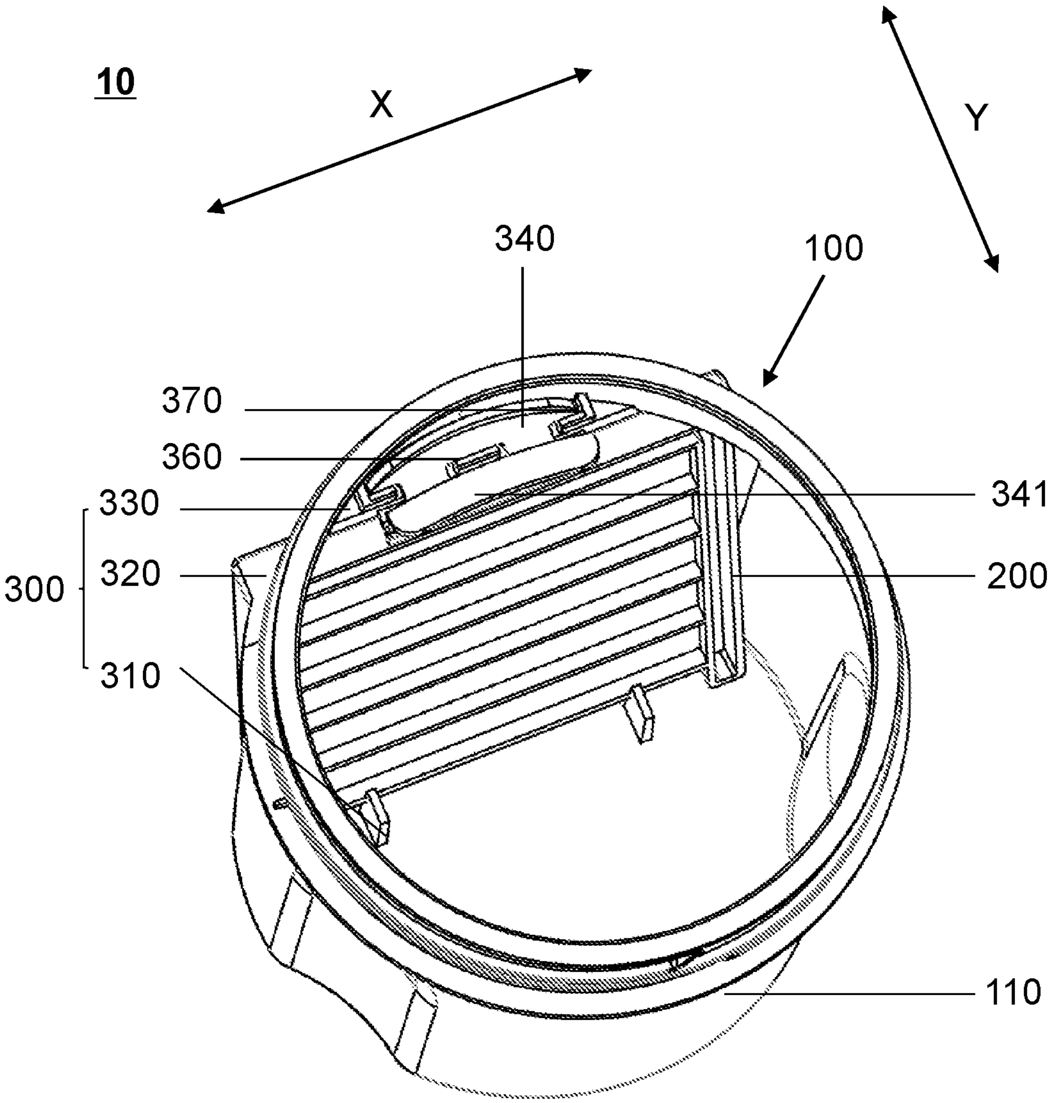
FIG. 3 is a schematic diagram illustrating an exemplary test component coupled to a cup according to some embodiments of the present disclosure.

For example, FIG. 3 is a schematic diagram illustrating an exemplary test component coupled to a cup according to some embodiments of the present disclosure, and FIG. 4 is a schematic diagram illustrating an exemplary cup without the test component according to some embodiments of the present disclosure.

As shown in FIGS. 3 and 4, the mounting structure 300 may include one or more first limiting components 310 disposed on the bottom wall of the cup 100. The bottom end of the test component 200 may be mounted between the one or more first limiting components 310 and the mounting plane 121. The position of the bottom end of the test component 200 may be limited by the one or more first limiting components 310. The bottom end here may be an end of the test component 200 away from the opening of the cup 100. In this embodiment, as the mounting plane 121 is inclined at a certain angle relative to the bottom wall of the cup 100, when the test component 200 is placed on the mounting plane 121, the test component 200 may slide downward relative to the mounting plane 121 if there is no the first limiting components 310, thereby detaching from the mounting plane 121. By disposing the one or more first limiting components 310 on the bottom wall of the cup 100, when the test component 200 is placed between the one or more first limiting components 310 and the mounting plane 121, the one or more first limiting components 310 may be abutted against the bottom end of the test component 200, so as to limit the movement of the test component 200, and thereby fixing the bottom end of the test component to the mounting plane 121.

In some embodiments, the number of first limiting component 310 may be one or more. For example, two first limiting components 310 may be disposed on the bottom wall of the cup 100, and the two first limiting components 310 may be spaced apart by a certain distance and located on two sides of the bottom end of the test component, ensuring that the test component is stably fixed on the mounting plane. In some embodiments, the two first limiting components 310 may be disposed symmetrically with respect to a midpoint in the lengthwise direction of the test component 200 so as to keep the test component 200 balanced. The lengthwise direction of the test component 200 may be parallel to a lengthwise direction of the flat portion 120, which may be indicated by an "X" in FIGS. 3 and 4.

In some embodiments, one of the two first limiting components 310 may be in a stripe shape, so that a degree of freedom of the test component 200 in one direction may be limited. In some embodiments, the shape of one of the two first limiting component 310 may be in an "L" shape, so that the degrees of freedom of the test component 200 in both directions may be limited by utilizing the "L" shaped limiting component.

In some embodiments, one of the two first limiting components 310 may include a limiting bar. In some embodiments, a distance between the bottom end of the limiting bar and the bottom end of the mounting plane may be controlled within a range. When the distance between the limiting bar and the mounting plane is within a suitable range, it may not only be convenient for mounting the test component, but also enables an accommodation of the test component, thereby avoiding a shaking of the detection.

In some embodiments, the cross-section of the limiting bar may be in a shape of, triangular, trapezoidal, circular, rectangular, triangle-like (e.g., one side of the triangle may be an arc), trapezoid-like (e.g., one side of the trapezoid may be an arc), rectangle-like (e.g., one side of the rectangle may be an arc), etc. The cross-section of the limiting bar may be a cross-section perpendicular to the lengthwise direction of the limiting bar (i.e., the first limiting component). The lengthwise direction of the limiting bar may be a direction from an end of the limiting bar away from the test component to an end of the limiting bar close to the test component (e.g., indicated as "Y" in FIGS. 3 and 4).

In some embodiments, as shown in FIGS. 3 and 4, the mounting structure may include a clamping slot 320 disposed on the sidewall of the cup 100. The clamping slot 320 may be disposed on a top region of the flat portion 120, and the top region of the test component may be clamped into the clamping slot 320. The top region of the test component may be an end region of the flat portion 120 near the opening of the cup 100. In this embodiment, the top region of the test component may be fixed by disposing the clamping slot 320 on an inner sidewall of the cup 100, and then securing the top region of the test component by clamping the top region of the test component into the clamping slot 320, so as to reliably fix the test component to the mounting plane of the flat portion 120.

In some embodiments, the test component may be rectangular in shape, there may be two clamping slots 320, and two top corners of the top region of the rectangular test component may be clamped into the two clamping slots 320.

For example, FIG. 5 is a schematic diagram illustrating an exemplary test component according to some embodiments according to the present disclosure. As shown in FIGS. 3-5, the mounting structure may further include a mounting platform 330, a bending portion 340, and a clamping assembly. The mounting platform 330 may be disposed on the inner sidewall of the cup 100. The mounting platform 330 may be disposed on a side of the flat portion 120 near the top region of the cup 100, an angle between the mounting platform 330 and the flat portion 120 may be greater than 0°. The bending portion 340 may be disposed on the test component, and the bending portion 340 may be able to bend with respect to the test component. The bending portion 340 may be fixed with the mounting platform 330 after bending through the clamping assembly.

In some embodiments, the clamping assembly may include a mounting recess 350, and a mounting projection 360. The mounting recess 350 may be disposed on one of the bending portion 340 and the mounting platform 330 and the mounting projection 360 may be disposed on the other one of the bending portion 340 and the mounting platform 330. In this embodiment, the bending portion 340 may be bent so that the bending portion 340 and the mounting platform 330 may be relatively fixed. Specifically, after the test component is placed on the mounting plane, the bending portion 340 may be bent at a certain angle so that the mounting projection 360 is embedded in the mounting recess 350. The movement of the bending portion 340 may be limited by a relative abutment of the mounting recess 350 and the mounting projection 360, and then the movement of the test component may be limited. This embodiment may be used in combination with the mounting structure in other embodiments of the present disclosure. For example, the bottom end and the top end of the test component may be limited by the one or more first limiting components 310 and one or more clamping slots 320, respectively, and then the test component may be further fixed by the mounting projection 360 and the mounting recess 350.

In some embodiments, as shown in FIGS. 4 and 5, the bending portion 340 may be provided with the mounting recess 350, and the mounting platform 330 may be provided with the mounting projection 360 corresponding to the mounting recess 350. When installing the test component, the bending portion 340 may be bent in a direction of an arrow "P" in FIG. 5, so that the mounting protrusion 360 may be embedded in the mounting recess 350 to complete the coupling.

In some embodiments, the clamping assembly may include a second limiting component 370 disposed on the mounting platform. The second limiting component 370 may be able to cooperate with a portion of an outer edge of the bending portion 340 after bending to realize the clamping. The outer edge may include two side edges along a length direction of the bending portion 340, and the length direction of the bending portion 340 may be parallel to the length direction of the test component and the length direction of the mounting platform 330, as shown by the arrow "X" in FIG. 3.

In some embodiments, as shown in FIGS. 4 and 5, a slot 380 may be disposed on each of the two sides of the outer edge of the length direction of the bending portion 340, and the second limiting component 370 may include two limiting projections disposed at two ends of the mounting platform 330 in the length direction, and the two limiting projections may be embedded in the two slots to realize the clamping, respectively. In some embodiments, one of the limiting projections of the second limiting component 370 may be in a shape of an "L", and the "L" shaped limiting projection may include a first strip portion and a second strip portion perpendicular to each other. The first strip portion may be embedded in the slot 380 to limit a movement of the bending portion 380 in a width direction (as shown by the "Y" in FIG. 3) of the mounting platform 330, and the second strip portion may be outside of the slot 380 and abut against the slot to limit the movement of the bending portion 340 in the lengthwise direction of the mounting platform 330 (as shown by the "X" in FIG. 3).

It may be noted that the clamping assembly described in FIGS. 3-5 is intended as an example only and is not intended to limit a specific form of the clamping assembly. In some embodiments, the clamping assembly may include a clamping component and a clamping base, the clamping component being able to clamp into the clamping base. The clamping component may be disposed on one of the bending portion 340 and the mounting surface 330, and the clamping base may be disposed on the other one of the bending portion 340 and the mounting surface 330. When installing the test component, the bending portion 340 may be bent to a certain angle, and then the clamping component may be clamped into the clamping base. For example, the clamping component may include a clamping ball.

In some embodiments, as shown in FIG. 5, the bending portion 340 may include a rotation assembly 342. The rotation assembly 342 may be used to realize a rotation of the bending portion 340 with respect to the test component, i.e., the bending portion 340 may rotate with respect to the test component by the rotation assembly 342. In some embodiments, the rotation assembly 342 may include a fixed component 3421 and a rotation component 3422. The rotation component 3422 and the fixed component 3421 may rotate around a certain axis (for example, the rotation component 3422 and the fixed component 3421 may be connected through a connecting shaft, and the rotation component 3422 and the fixed component 3421 may rotate around an axis where the connecting shaft locates). One of the fixed component 3421 and the rotation component 3422 may be disposed on the bending portion 340 and the other one of the fixed component 3421 and the rotation component 3422 may be disposed on the test component, and the bending of the bending portion 340 may be realized by a relative rotation of the rotation component 3422 and the fixed component 3421. An exemplary rotation assembly 342 may include a hinge assembly.

In some embodiments, the bending portion 340 may be provided with a toggle portion 341. The toggle portion 341 may facilitate the bending of the bending portion 340 by a user. In some embodiments, the toggle portion 341 may be disposed at an end region of the bending portion 340 away from the test component, and the toggle portion 341 may protrude from a surface of the bending portion 340 (the surface provided with the mounting recess 350) to facilitate the user to control the bending portion 340 to bend using the toggle portion 341.

In some embodiments, the mounting structure may mount the test component in other modes in addition to the clamping mode. For example, the mounting structure may include a magnetic assembly, a screw-bolt assembly, an adhesive assembly (e.g., a Velcro), a clamp assembly, etc. Correspondingly, the test component may be disposed with a structure adapted to the limiting structure to cooperate with the limiting structure to fix the test component to the mounting platform 330. In some embodiments, the limiting structure may also be disposed on the mounting plane for fixing the test component to the mounting plane, which is not repeated here.

In some embodiments, the angle between the mounting platform 330 and the mounting plane may be controlled within a certain range so as to facilitate the coupling of the mounting recess 350 of the bending portion 340 with the mounting projection 360 on the mounting platform 330.

Beneficial effects that may be brought about by the detection device of the embodiments of the present disclosure may include, but not limited to:(1) by disposing a portion of the sidewall of the cup into a flat surface, and disposing the test component on the mounting plane corresponding to the flat surface, the user may be able to observe the test strip on the test component more clearly, and thus obtaining the detection result more conveniently; (2) by disposing the mounting platform on the top region of the mounting plane, and setting the corresponding mounting slots and mounting protrusions on the mounting platform and the bending portion, a fixing and disassembly of the test component may be implemented by controlling the bending of the bending section, which is not only convenient for the user to disassemble and replace the test component, but also ensures that the test component can be reliably fixed on the mounting plane; (3) by inclining the plane on which the opening of the cup is located relative to the plane where the bottom wall of the cup is located, on the one hand, it may be convenient for demolding, and on the other hand, it may be more convenient for the user to observe an internal situation of the cup from the opening, and it may be convenient to obtain the detection result of the test strip; (4) by inclining the flat portion of the cup at a certain angle relative to the bottom wall of the cup, it may be more convenient for the user to observe the test component disposed on the mounting plane from the opening, and it may be convenient to obtain the detection result of the test strip. At the same time, after inclining at a certain angle, an area of the flat portion may be expanded, so that more test strips may be disposed. It is to be noted that the beneficial effects generated by different embodiments may be different, and the beneficial effects generated in different embodiments may be any one or a combination of any one or more of the above, or may be any other beneficial effect obtained.

The basic concepts have been described above, and it is apparent that to those skilled in the art, the above detailed disclosure is intended to be merely exemplary and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

What is claimed is:

1. A detection device, comprising:

a cup used to accommodate a substance, a sidewall of the cup including a curved portion and a flat portion, two sides of the curved portion being connected with two sides of the flat portion, respectively;

a test component disposed with a plurality of test strips, the test component being disposed within the cup; and a mounting structure, the test component being disposed on the flat portion through the mounting structure;

wherein the mounting structure further includes a mounting platform, a bending portion and a clamping assembly, the mounting platform being disposed on the inner sidewall of the cup, the bending portion being disposed on the test component;

the mounting platform being disposed on a side of the flat portion near the top region of the cup, an angle between the mounting platform and the flat portion being greater than 0°;

the bending portion is fixed to the mounting platform through the clamping assembly;

the bending portion further includes a rotation assembly, the bending portion rotates relative to the test component by the rotation assembly.

2. The detection device of claim 1, wherein the sidewall of the cup further includes a transition portion, bottoms of the curved portion and the flat portion being connected with a bottom wall of the cup, a portion of the flat portion and the curved portion being directly connected of the sidewall of the cup on the circumference direction, and a portion of the flat portion and the curved portion being connected through the transition portion.

3. The detection device of claim 2, wherein the flat portion includes a mounting plane, the mounting plane inclines with respect to the bottom wall of the cup, and the mounting plane is used for mounting the test component.

4. The detection device of claim 1, wherein the mounting structure includes one or more first limiting components provided on the bottom wall of the cup, a bottom end of the test component being mounted between the first limiting components and the flat portion.

5. The detection device of claim 1, wherein two first limiting components are disposed on the bottom wall of the cup, the two first limiting components being disposed on both sides of the bottom end of the test component; or the two first limiting components being disposed symmetrically with respect to a midpoint in a lengthwise direction of the test component.

6. The detection device of claim 5, wherein one of the two first limiting components is in a stripe shape;

or, one of the two first limiting components is in an “L” shape;

or, a cross-section of one of the two first limiting components is triangular, trapezoidal, circular, rectangular, triangular-like, trapezoidal-like, or rectangular-like.

7. The detection device of claim 1, wherein the mounting structure includes one or more clamping slots disposed on an inner sidewall of the cup, the one or more clamping slots being located at a top region of the flat portion, and a top end of the test component being clamped into the one or more clamping slots.

8. The detection device of claim 7, wherein the test component is rectangular, a number of the one or more clamping slots is two, and two top corners of the top end of the test component clamping into each of the two clamping slots.

9. The detection device of claim 1, the clamping assembly including a mounting recess disposed on one of the bending portion and the mounting platform, and a mounting projection disposed on the other one of the bending portion and the mounting platform, the mounting projection being able to clamp into the mounting recess.

10. The detection device of claim 1, wherein the clamping assembly includes a second limiting component disposed on the mounting platform, the second limiting component being able to clamp and cooperate with a portion of an outer edge of the bending portion after bending.

11. The detection device of claim 10, wherein a slot is disposed on each of both sides of the outer edge in a lengthwise direction of the bending portion, the second limiting component including two limiting projections disposed at both ends of the mounting platform in the lengthwise direction, one of the two limiting projections being able to be embedded into slot disposed on each of both sides of the outer edge.

12. The detection device of claim 11, wherein the limiting projection is in a shape of an "L", the limiting projection including a first strip portion and a second strip portion perpendicular to each other, the first strip portion being embedded in the slot to limit a movement of the bending portion in a width direction of the mounting platform, the second strip portion being outside of the slot and abut against the slot to limit the movement of the bending portion in the lengthwise direction of the mounting platform.

13. The detection device of claim 1, wherein the clamping assembly includes a clamping component and a clamping base, the clamping component being able to clamp into the clamping base, the clamping component being disposed on one of the bending portion and the mounting platform, and the clamping base being disposed on the other one of the bending portion and the mounting platform, and when the bending portion is bent to a certain angle, the clamping component is able to clamp into the clamping base.

14. The detection device of claim 1, wherein the rotation assembly includes a fixed component and a rotation component, the rotation component and the fixed component rotating around a certain axis, one of the fixed component and the rotation component being disposed on the bending portion and the other one of the fixed component and the rotation component being disposed on the test component.

15. The inspection device of claim 1, wherein the bending portion is further provided with a toggle portion, the toggle portion being disposed at an end of the bending portion away from the test component, the toggle portion protruding from a surface of the bending portion, and the toggle portion is configured to control the bending portion to bend.

16. The detection device of claim 1, wherein the cup is disposed with an opening at a top region of the cup; an angle between a plane where the opening is located and the bottom wall of the cup is greater than 0° and less than 90°.

17. The detection device of claim 1, wherein an angle between an inner side of the flat portion and an inner side of a bottom wall of the cup is greater than 90° is provided.

18. The detection device of claim 1, wherein the sidewall of the cup is provided with one or more graduated lines.

* * * * *